United States Patent [19]

Reid et al.

[11] 4,150,843
[45] Apr. 24, 1979

[54] SEAT BELT SECURING DEVICE

[75] Inventors: Kenneth H. Reid, Mt. Clemens; William C. Jarski, Oxford; George W. Boymer, Warren; Clifford E. Heidenreich, Bloomfield Hills, all of Mich.

[73] Assignee: General Motors Corporation, Detroit, Mich.

[21] Appl. No.: 846,511

[22] Filed: Oct. 28, 1977

[51] Int. Cl.² .............................................. B60R 21/10
[52] U.S. Cl. ...................................... 280/744; 280/747
[58] Field of Search .............. 280/744, 747; 24/241 P, 24/241 PD, 241 PS; 297/388, 389

[56] References Cited

U.S. PATENT DOCUMENTS

| 3,227,490 | 1/1966 | Svensson | 297/389 |
| 3,698,048 | 10/1972 | Weman | 24/241 P |
| 3,844,001 | 10/1974 | Holmberg | 280/744 |

Primary Examiner—Robert R. Song
Attorney, Agent, or Firm—Charles E. Leahy

[57] ABSTRACT

A seat belt securing device includes a C-shaped hook member having upper and lower legs spaced apart to define a belt receiving slot having a forwardly facing open end. The lower leg is pivotally mounted on a mounting bracket attached to the vehicle body by a resilient yieldable support for positioning the hook member adjacent the hip of the seated occupant. The upper leg has a curved lower face engaged by the belt upon entry of the belt into the slot and is arranged relative the pivot so that belt force applied against the hook member by a retractor associated with the belt and by restraint of the occupant maintain the hook member in a downwardly directed belt capturing position. A gate member is pivotally mounted on the mounting bracket and is spring biased to a normal position where its one end engages the upper leg to close the open end of the slot and a latch portion at its other end engages a notch in the lower leg to latch the hook member against rearward motion. The spring yields to permit movement of the gate member to a slot opening position when engaged by the belt during engagement of the belt over the upper leg and insertion into the slot. During restraint of the occupant the resilient support yields to permit bodily forward and pivoting movement of the hook member and mounting bracket to maintain capture of the belt without imposing a load on the gate member. The belt is released by pivoting the gate member rearwardly to unlatch the hook member and pivoting the hook member rearwardly to an upwardly directed position to release the belt for windup by the retractor.

3 Claims, 4 Drawing Figures

U.S. Patent    Apr. 24, 1979    4,150,843
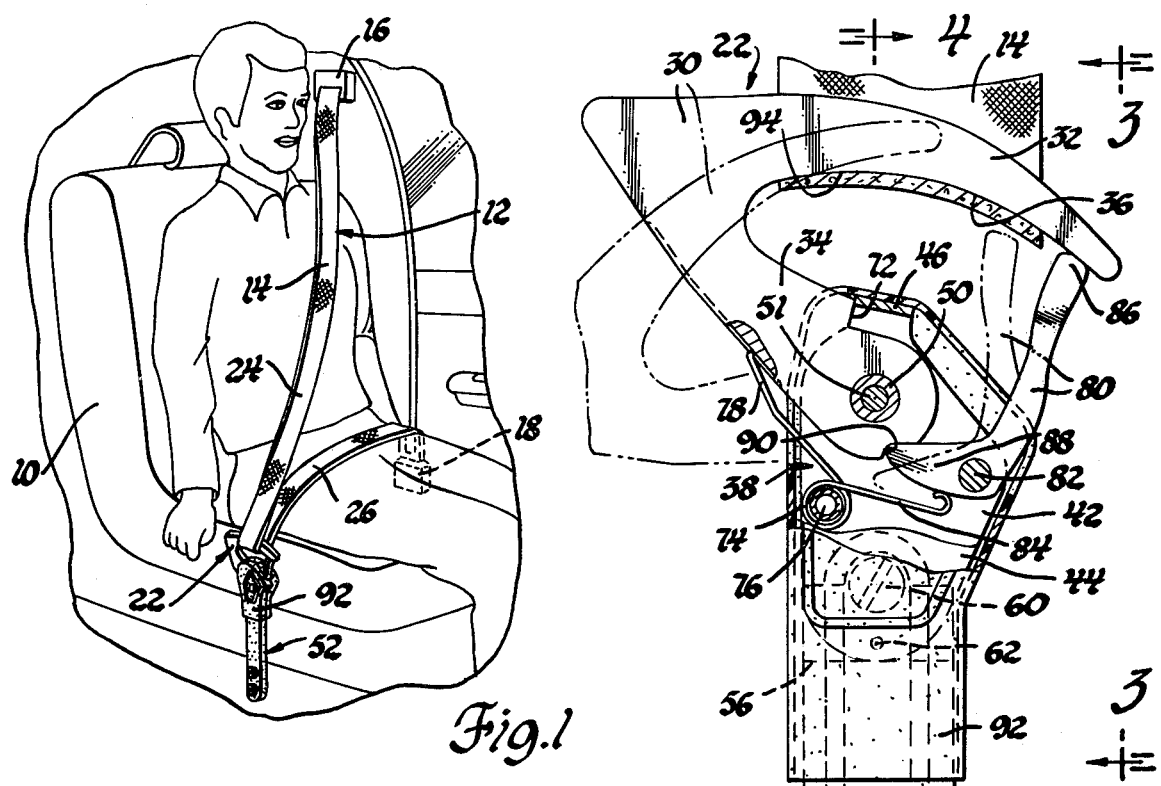
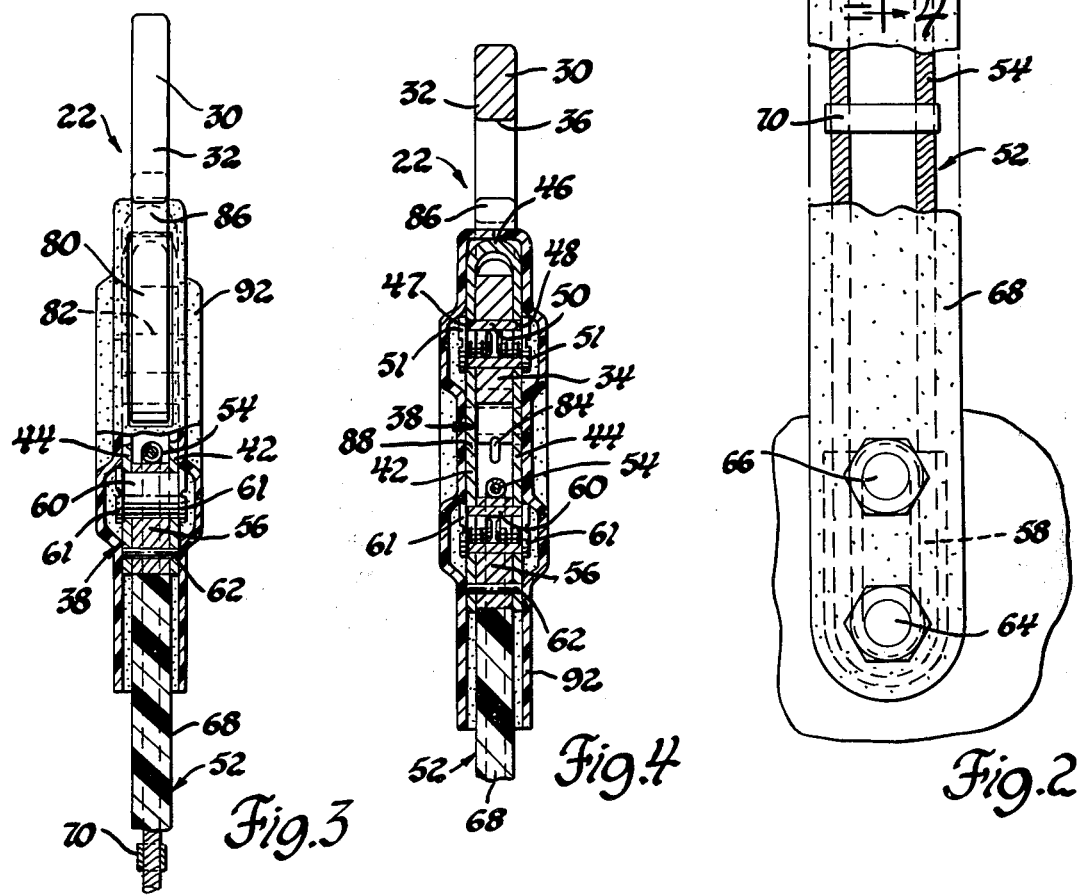

SEAT BELT SECURING DEVICE

BACKGROUND OF THE INVENTION

The invention relates generally to a seat belt system and more particularly to an improved securing device for releasably securing a belt in an occupant restraining position.

This invention provides an improvement in the seat belt securing device of U.S. Ser. No. 822,663, filed Aug. 8, 1977, which is a Continuation-in-Part of Ser. No. 727,290, filed Sept. 27, 1976 by Gerald J. Marsh et al and assigned to the assignee of this invention. That invention provides a C-shaped hook member having upper and lower legs spaced apart to define a belt receiving slot having a forwardly facing open end. The lower leg is pivotally mounted on a mounting bracket attached to the vehicle body by a resilient yieldable support for positioning the hook member adjacent the hip of the seated occupant. A gate member is pivotally mounted on the mounting bracket and spring biased against an abutment lip extending downwardly from the upper leg to close the open end of the slot and thereby assist retention of the belt against inadvertent disengagement. Release of the belt is effected by manually pivoting the hook member rearwardly to an upwardly directed position to move the upper leg away from the gate member and thereby release the belt for windup by the retractor.

BRIEF SUMMARY OF THE INVENTION

The present invention assures against inadvertent belt release by providing a manually operable latch which must be released in order to effect rearward pivoting movement of the hook member to release the belt.

A seat belt securing device includes a C-shaped hook member having upper and lower legs spaced apart to define a belt receiving slot having a forwardly facing open end. The lower leg is pivotally mounted on a mounting bracket attached to the vehicle body by a resilient yieldable support for positioning the hook member adjacent the hip of the seated occupant. The upper leg has a curved lower face engaged by the belt upon entry of the belt into the slot and is arranged relative the pivot so that belt force applied against the hook member by a retractor associated with the belt and by restraint of the occupant maintain the hook member in a downwardly directed belt capturing position. A gate member is pivotally mounted on the mounting bracket and is spring biased to a normal position where its one end engages the upper leg to close the open end of the slot and a latch portion at its other end engages a notch in the lower leg to latch the hook member against rearward motion. The spring yields to permit movement of the gate member to a slot opening position when engaged by the belt during engagement of the belt over the upper leg and insertion into the slot. During restraint of the occupant the resilient support yields to permit bodily forward and pivoting movement of the hook member and mounting bracket to maintain capture of the belt without imposing a load on the gate member. The belt is released by pivoting the gate member rearwardly to unlatch the hook member and pivoting the hook member rearwardly to an upwardly directed position to release the belt for windup by the retractor.

One feature, object and advantage of the invention is the provision of a seat belt securing hook having a latch which insures against pivoting movement of the hook member to the belt releasing position.

A further feature, object and advantage of the invention is the provision of a seat belt securing device having a C-shaped hook member defining an open end belt receiving slot and a pivotally movable gate member for closing the open end of the slot and simultaneously latching the hook member against rearward pivoting movement to bar inadvertent release of the belt from the securing device.

These and other features, objects and advantages of the invention will become apparent upon consideration of the specification and the appended drawings in which:

FIG. 1 shows the belt system in the occupant restraining position by engagement of the securing device;

FIG. 2 is a side elevation view of the seat belt securing device wherein the belt securing position is shown in solid lines and the belt releasing position is shown in phantom lines;

FIG. 3 is a view taken in the direction of arrows 3—3 of FIG. 2; and

FIG. 4 is a sectional view taken in the direction of arrows 4—4 of FIG. 2.

DESCRIPTION OF THE PREFERRED EMBODIMENT

Referring to FIG. 1, there is shown a motor vehicle occupant compartment wherein a vehicle seat 10 is conventionally arranged. A seat belt system, generally indicated at 12, is provided for restraining the occupant in the seated position.

The seat belt system 12 includes a single loop of seat belt 14 which has its upper end attached to the vehicle body by an inertia responsive retractor 16 and its lower end conventionally attached to the vehicle body floor pan or body sill by an anchor bracket 18. A securing device, generally indicated at 22, is attached to the vehicle body inboard the seat 10. The securing device 22 engages the belt 14 in occupant restraining position as seen in FIG. 1 wherein the belt is divided into a shoulder belt portion 24 diagonally positioned against the chest of the occupant and a lap belt portion 26 which crosses the lap of the occupant.

Referring to FIG. 2, the securing device 22 includes a C-shaped hook member 30 having an upper leg 32 and a lower leg 34 which are spaced apart to define a belt receiving slot 36 which opens in the forward direction.

A mounting bracket 38 is preferably a sheet metal stamping and has upright walls 42 and 44 which are spaced apart in parallel relation by a curved wall 46 to define a space for receiving the lower leg 34 of hook member 30. As best seen in FIG. 4, a pivot shaft 50 and a pair of associated retaining screws 51 extend through aligned apertures 47 and 48 of the bracket walls 42 and 44 to mount the hook member 30 for forward and rearward pivotal movement between the solid line and phantom line indicated positions of FIG. 2.

Mounting bracket 38 is connected to the vehicle floor and resiliently supported adjacent the hip of the seat occupant by a strap assembly indicated generally at 52. As best seen in FIG. 2, the strap assembly 52 includes a loop of flexible cable 54 having an upper end which encircles a mounting plate 56 and a lower end which engages an anchor 58. The mounting plate 56 is attached to the bracket walls 42 and 44 of mounting bracket 38 by a load bearing pin 60 having a pair of associated retaining screws 61 and an antirotation pin 62 which respectively extend through aligned apertures of the bracket walls 42 and 44 and the mounting plate 56 so that the plate 56 is supported against rotation relative the cable 54. The anchor 58 is preferably a tubing construction which is swaged about the cable loop 54 and has a central opening between spaced apart vertical legs to receive vertically spaced bolts 64 and 66 which attach the lower end of strap assembly 52 to the vehicle body floor pan or a like load bearing structure. The cable 54 mounting plate 56 and anchor 58 of strap assembly 52 are encapsulated in a molded flexible plastic boot 68 which surrounds the cable loop 54 and extends between the plate 56 and anchor 58 to hold the cable loop 54 at its full length and resiliently and yieldably position the securing device 22 adjacent the hip of the seated occupant. A tie strap 70 extends between the legs of the cable loop 54 at the midpoint for added stability.

The limit of forward rotation of hook member 30 to the solid line indicated belt-capturing position of FIG. 2 is defined by engagement of a shoulder 72 of lower leg 34 with the curved wall 46 of the mounting bracket 38. As best seen in FIG. 2, a torsion spring 74 encircles a mounting pin 76 carried on the mounting bracket 38 and has a leg 78 engaging the lower leg 34 to normally urge the hook member 30 to its solid line position of FIG. 2 wherein the shoulder 72 engages curved wall 46 of mounting bracket 38. Torsion spring 74 yields to permit rearward rotation of the hook member 30 to the phantom line indicated position.

A gate member 80 is pivotally mounted on the mounting bracket 38 adjacent the open end of the slot 36. Gate member 80 extends between the bracket walls 42 and 44 and is pivotally mounted thereon by a pivot pin 82 which extends between the bracket walls 42 and 44. The torsion spring 74 has a leg 84 which urges the gate member 80 to a normal position indicated in solid lines in FIG. 2 wherein an upper end portion 86 of the gate member 80 contacts the terminal end of upper leg 32 to close the open end of the slot 36 and simultaneously positions a latching portion 88 of the gate member 80 in engagement of a notch 90 of the lower leg 34 to latch the hook member 30 against rearward pivoting movement to the phantom line indicated belt-releasing position. The leaf spring leg 84 is yieldable to permit pivotal movement of the gate member 80 to the phantom line indicated position of FIG. 2 so that the slot 36 is opened and the latching portion 88 is removed from the notch 90 to free the hook member 30 for rearward pivoting movement. A molded plastic sheath 92 encloses the mounting bracket 38 and the elements attached thereto to enhance the appearance of the securing device.

Referring again to FIG. 1, it will be understood that prior to entry of the occupant into the vehicle, the retractor 16 will have wound the belt to a stored position wherein the belt 14 is disposed adjacent the wall of the passenger compartment. When the occupant enters the passenger compartment and assumes the seated position, the belt system 12 may be deployed to its restraining position of FIG. 1. The occupant moves the belt system to the restraining position by hooking his right thumb under the belt 14 and unwinding the belt from the retractor 16. The belt 14 is thrust against the gate member 80 causing it to pivot to its phantom line indicated position of FIG. 2 as permitted by the yielding of the leg 84 of torsion spring 74. Accordingly, the belt 14 may be inserted into the slot 36 and over the upper leg 32 of the hook member 30 as seen in FIG. 1. After the belt enters the slot 36, the torsion spring 74 returns the gate member 80 to its solid line indicated position of FIG. 2 wherein the slot 36 is closed and latching portion 88 engages notch 90 of hook member 30 to prevent inadvertent rearward pivoting of hook member 30 which would release the belt. When upper end portion 86 of gate member 80 engages the end of upper leg 32 and the latching portion 88 simultaneously engages notch 90, there is an audible click which assures the occupant that the belt 14 is secured. The belt 14 is held in engagement with a curved lower face 94 of upper leg 32 by the tension exerted on the belt by retractor 16 to thereby retain the belt 14 against inadvertent disengagement from the leg 32. Furthermore, the belt 14 may bear against the gate member 78 so that it will not become inadvertently disengaged, particularly in those instances where a tension reliever is associated with the retractor 16.

Referring to the solid line indicated belt capturing position of FIG. 2, it is seen that the upper leg 32 and particularly the belt engaging curved lower face 94 thereof is somewhat downwardly directed and the pivot shaft 50 is located with respect to the lower face 94 of the upper leg 32 so that the force applied on the hook member 30 by the belt 14 will not by itself move the hook member 30 to its phantom line indicated belt releasing position. In particular, the pivot shaft 50 is located forwardly of a perpendicular bisector of the chord which subtends that portion of the arcuate lower face 94 engaged by the belt 14.

Referring to FIG. 1, it will be understood that the inertia responsive retractor 16 is locked against belt unwinding when the vehicle encounters a predetermined inertia stimulus such as rapid deceleration of the vehicle. Forward excursion of the occupant's lower torso is limited by engagement with the lap belt portion 26 while forward excursion of the upper torso is limited by engagement with the shoulder belt portion 24. It will be appreciated that this forward loading of the seat belt 14 tends to disengage the belt 14 from the forward facing open end of slot 36. However, the aforedescribed downward direction of the upper leg 32 and the relationship between the lower face 94 and pivot shaft 50 cooperate to induce forward pivoting and bodily shifting movement of the hook member 30 and mounting bracket 38 as permitted by resilient yielding of the strap assembly 52. Accordingly, the hook member 30 follows the limited forward excursion of the occupant as slack is removed from belt 14 and the seat cushion is compressed, so that the belt is retained in engagement with the lower face 94 and does not become bunched up against the gate member 80 or impose any significant load thereon. Thus, it will be appreciated that the gate member 80 is desirable to insure against inadvertent disengagement of the belt from the upper leg 32 but is not mandatory for effective restraint of the occupant during an emergency situation.

When the occupant desires to alight from the vehicle, the gate member 80 is manually pivoted rearwardly to remove the latching portion 88 from notch 90 of lower leg 34 and the hook member 30 is manually pivoted rearwardly to the phantom line position of FIG. 2 wherein the upper leg 32 assumes an upwardly directed attitude wherein the belt is released for retraction by the retractor 16. As the hook member 30 is pivoted rearwardly to its phantom line indicated position, the gate member 80 may be released for return movement to its solid line position in readiness for subsequent latching of the hook member. The hook member 30 provides an integral lever arm extending rearwardly of the pivot shaft 50 by which a modest effort applied to the rearward end thereof by the occupant will pivot the hook member 30 to the phantom line indicated upwardly directed belt releasing position even though the belt may be loaded by the weight of the occupant's body. This ability of the occupant to disengage the belt is important when the vehicle comes to rest in thoe unconventional attitudes wherein restraint of the occupant is important and yet must be terminated to enable the occupant to alight from the vehicle. To this end, it is desirable that the curved lower face 94 of the upper leg 32 be generally arcuate about the pivot shaft 50.

Referring again to FIG. 1, it will be understood that the securing device 22 of this invention may be used for securing a two-point lap or shoulder belt. In such an application, one end of the lap or shoulder belt would be anchored on the vehicle body by an anchor plate or a retractor. The other end of the seat belt would be reversely folded and sewn to itself to provide a loop capable of engagement over the upper leg 32 and insertion into the slot 36 of securing device 22. Furthermore, the securing device may be mounted on the occupant seat associated with the vehicle body instead of directly on the vehicle body.

Thus, the invention provides a new and improved device for securing a seat belt in an occupant restraining position independently of any securing element carried on the belt.

The embodiments of the invention in which an exclusive property or privilege is claimed are defined as follows:

1. In a vehicle body seat belt system having one belt end anchored at one side of the seated occupant and a loop of belt adapted for securement at the other side of the seat to position the belt in the restraining position about the seated occupant, a securing device at the other side of the seated occupant to releasably capture the belt and comprising: mounting means on the vehicle body generally adjacent the hip of the seated occupant; a hook member having a forwardly opening belt receiving slot defining a lower mounting leg having a latch notch and an upper leg having a belt engaging portion for engagement by the belt upon entry of the belt into the slot; pivot means acting between the mounting means and the mounting leg of the hook member and being arranged relative the belt engaging portion of the upper leg so that force applied against the hook member by the belt maintains the belt engaging portion and belt receiving slot in a downwardly directed belt capturing position; said hook member being rearwardly pivotable to an upwardly directed belt releasing position upon manual pivoting effort applied thereto by the seat occupant to release the belt for movement from the restraining position; and a latch member movably mounted on the mounting means generally adjacent the pivot means and normally engaged within the notch of the hook member lower leg to block rearward pivoting movement of the hook member, said latch member being releasable from engagement within the notch by the seated occupant to permit rearward pivoting movement of the hook member to the upwardly directed belt releasing position.

2. In a vehicle body seat belt system having one end anchored at one side of the seated occupant and a loop of belt adapted for securement at the other side of the seated occupant, a securing device for releasably capturing the loop to position the belt in the occupant restraining position and comprising:

mounting means on the vehicle body generally adjacent the hip of the seated occupant;
a C-shaped hook member having a belt engaging leg and a mounting leg spaced apart to define a belt receiving slot having a forwardly facing open end;
pivot means acting between the mounting means and the mounting leg to mount the hook member for pivotal movement about an axis extending generally transversely of the vehicle body for movement between a normal position wherein the belt engaging leg and the slot extend in a downwardly belt capturing direction and a rearwardly pivoted position wherein the belt engaging leg and the seat extend in an upwardly belt releasing direction;
a gate member pivotally mounted on the mounting means adjacent the open end of the slot to selectively close the open end of the belt receiving slot and having a locking portion selectively engageable with the lower leg to block rearward pivoting movement;
and spring means urging the gate member to close the open end of the slot and engage the locking portion with the lower leg to block rearward pivoting movement and thereby prevent release of the belt until manual movement of the gate member to disengage the locking portion from the lower leg.

3. In a vehicle body seat belt system having one end anchored at one side of the vehicle seat and a loop of belt adapted for securement at the other side of the seated occupant, a securing device for releasably capturing the loop to maintain the belt in the occupant restraining position and comprising:

a C-shaped hook member having upper and lower legs spaced apart to define a belt receiving slot having a forwardly facing open end;
a mounting bracket mounted on the vehicle body;
pivot means acting between the mounting bracket and the lower leg to mount the hook member for pivotal movement about an axis extending generally transversely of the vehicle body;
first spring means acting between the mounting bracket and the hook member and urging the hook member forwardly to a normal position wherein the legs and the slot extend in a downwardly belt capturing direction and being yieldable to permit rearward pivoting movement wherein the legs and slot extend in an upwardly belt releasing direction;
a gate member pivotally mounted on the bracket adjacent the open end of the slot to selectively close the open end of the belt receiving slot and having a locking portion selectively engageable with the lower leg to block rearward pivoting movement;
and second spring means urging the gate member to close the open end of the slot and yielding to permit movement of the gate member to a slot opening position when engaged by the belt during insertion of the belt into the belt receiving slot and over the upper leg, said second spring means returning the gate member to the slot closing position after entry of the belt into the slot to close the slot and to engage the locking portion with the lower leg to block rearward pivoting movement to prevent inadvertent release of the belt,
said second spring means yielding to permit manual pivoting of the gate member to disengage the locking portion from the lower leg whereby the hook member may be pivoted rearwardly to a position wherein the upper leg extends in an upwardly direction to release the belt.

* * * * *